US011838191B2

(12) United States Patent
Chen et al.

(10) Patent No.: US 11,838,191 B2
(45) Date of Patent: *Dec. 5, 2023

(54) AUTOMATICALLY MANAGING PERFORMANCE OF SOFTWARE IN A DISTRIBUTED COMPUTING ENVIRONMENT

(71) Applicant: RED HAT, INC., Raleigh, NC (US)

(72) Inventors: Huamin Chen, Newton, MA (US); Roland Huss, Pegnitz (DE)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,882

(22) Filed: Oct. 6, 2022

(65) Prior Publication Data
US 2023/0024965 A1  Jan. 26, 2023

Related U.S. Application Data

(63) Continuation of application No. 16/903,828, filed on Jun. 17, 2020, now Pat. No. 11,516,096.

(51) Int. Cl.
*H04L 41/5041* (2022.01)
*G06F 8/60* (2018.01)
(Continued)

(52) U.S. Cl.
CPC ............ *H04L 41/5048* (2013.01); *G06F 8/60* (2013.01); *G06F 9/44594* (2013.01);
(Continued)

(58) Field of Classification Search
CPC . H04L 41/5048; H04L 41/5009; H04L 67/10; H04L 41/0895; H04L 41/40;
(Continued)

(56) References Cited

U.S. PATENT DOCUMENTS 8,261,295 B1   9/2012 Risbood et al.
8,429,630 B2   4/2013 Nickolov et al.
(Continued)

OTHER PUBLICATIONS

Ahmed, M., "Kubernetes Autoscaling 101: Cluster Autoscaler, Horizontal Pod Autoscaler, and Vertical Pod Autoscaler," Jul. 10, 2018, https://levelup.gitconnected.com/kubernetes-autoscaling-101-cluster-autoscaler-horizontal-pod-autoscaler-and-vertical-pod-2a441d9ad231.

(Continued)

*Primary Examiner* — Michael Won
(74) *Attorney, Agent, or Firm* — Kilpatrick Townsend & Stockton LLP

(57) ABSTRACT

Software performance can be automatically managed in a distributed computing environment. In one example, a system that can receive metrics information describing resource usage by a first instance of a service in a distributed computing environment. The system can also determine a quality-of-service (QoS) constraint for the service. The system can then modify a definition file based on the metrics information and the QoS constraint, the definition file being configured for deploying instances of the service in the distributed computing environment. The system can deploy a second instance of the service in the distributed computing environment using the modified definition file. As a result, the second instance can more closely satisfy the QoS constraint than the first instance.

20 Claims, 3 Drawing Sheets

(51) Int. Cl.
*G06F 9/50* (2006.01)
*G06N 20/00* (2019.01)
*H04L 41/5009* (2022.01)
*H04L 67/10* (2022.01)
*G06F 9/445* (2018.01)

(52) U.S. Cl.
CPC ........... *G06F 9/5027* (2013.01); *G06N 20/00* (2019.01); *H04L 41/5009* (2013.01); *H04L 67/10* (2013.01); *G06F 2209/506* (2013.01)

(58) Field of Classification Search
CPC ... H04L 43/20; H04L 41/145; H04L 43/0864; H04L 41/0806; H04L 41/5054; H04L 43/0876; G06F 8/60; G06F 9/44594; G06F 9/5027; G06F 2209/506; G06F 9/5072; G06N 20/00; G06N 3/08
See application file for complete search history.

(56) References Cited

U.S. PATENT DOCUMENTS

| | | | |
|---|---|---|---|
| 8,966,492 B2* | 2/2015 | Kikuchi | H04L 41/5025 370/328 |
| 10,474,501 B2 | 11/2019 | Ghodsi et al. | |
| 10,554,740 B2 | 2/2020 | Bailey et al. | |
| 2002/0065907 A1* | 5/2002 | Cloonan | H04L 41/5006 709/228 |
| 2003/0191989 A1 | 10/2003 | O'Sullivan | |
| 2005/0038833 A1 | 2/2005 | Colrain et al. | |
| 2008/0189278 A1* | 8/2008 | Akkiraju | H04L 67/02 |
| 2014/0074973 A1* | 3/2014 | Kumar | H04L 67/60 709/217 |
| 2015/0236962 A1* | 8/2015 | Veres | H04L 47/805 370/230.1 |
| 2017/0155560 A1 | 6/2017 | Lee et al. | |
| 2020/0042388 A1* | 2/2020 | Roberts | G06F 11/1092 |
| 2020/0159415 A1* | 5/2020 | Neelakantam | G06F 3/065 |
| 2020/0374127 A1* | 11/2020 | Wei-Kocsis | H04L 63/123 |
| 2021/0021609 A1 | 1/2021 | Smith et al. | |
| 2021/0349772 A1* | 11/2021 | Kordjazi | G06F 11/3447 |

OTHER PUBLICATIONS

Cheng, B., et al., "Fog Function: Serverless Fog Computing for Data Intensive IoT Services," NEC Laboratories Europe, Heidelberg, Germany; NEC Solution Innovators, Ltd., Tokyo, Japan, Jul. 18, 2019, https://arxiv.org/pdf/1907.08278.pdf.

Farid, M., et al., "Edge Computing for Serverless Applications," Offering Management; Distinguished Engineer, Serverless / FaaS; Engineering Manager, IBM Cloud CDN; GTM Offering Manager— IBM Cloud Network, Jul. 8, 2019, https://www.ibm.com/cloud/blog/edge-computing-for-serverless-applications.

Jonas, E., et al., "Cloud Programming Simplified: A Berkeley View on Serverless Computing," UC Berkeley, Feb. 9, 2019, https://arxiv.org/pdf/1902.03383.pdf.

Nastic, S., et al., "A Serverless Real-Time Data Analytics Platform for Edge Computing," TU Wien; Ss. Cyril and Methodius University; University of Innsbruck, 2017, https://dsg.tuwien.ac.at/team/sd/papers/Zeitschriftenartikel_S_Nastic_A Serverless.pdf.

Shekhar, S., et al., "Dynamic Resource Management Across Cloud-Edge Resources for Performance-Sensitive Applications," Vanderbilt University, http://www.dre.vanderbilt.edu/~gokhale/WWW/papers/CCGrid17_DocSymp.pdf.

Non-Final Office Action for U.S. Appl. No. 16/903,828 dated Nov. 10, 2021.

Non-Final Office Action for U.S. Appl. No. 16/903,828 dated Feb. 8, 2022.

* cited by examiner

AUTOMATICALLY MANAGING PERFORMANCE OF SOFTWARE IN A DISTRIBUTED COMPUTING ENVIRONMENT

CROSS-REFERENCE TO RELATED APPLICATION

This is a continuation of and claims priority to U.S. patent application Ser. No. 16/903,828, filed Jun. 17, 2020, the entirety of which is hereby incorporated herein by reference.

TECHNICAL FIELD

The present disclosure relates generally to managing software performance in a computing environment. More specifically, but not by way of limitation, this disclosure relates to automatically managing performance of software in a distributed computing environment.

BACKGROUND

Distributed computing environments have grown in popularity. Examples of such distributed computing environments can include cloud computing environments, data grids, and computing clusters. More recently, distributed computing environments have begun to incorporate serverless computing capabilities. Serverless computing enables developers to execute code without the developer having to consider how to provision the appropriate computing resources ("resources") for the code. For example, a developer can upload code to a serverless computing environment, which is a distributed computing environment with serverless computing capabilities. Then, the serverless computing environment can automatically provision the resources required to run the code and scale to meet demand, without burdening the developer with those details. Since this setup and scaling of resources is completely hidden and abstracted from the developer, the computing environment appears to be "serverless" to the developer, despite it actually including one or more physical or virtual servers.

Serverless computing environments often perform tasks by executing serverless functions, such as a Lambda function in Amazon Web Services. A serverless function is generally an ephemeral, self-contained, discrete piece of code (e.g., set of logic or operations) configured to perform a particular task when executed in a serverless computing environment and then become dormant when execution completes. Serverless functions can be triggered in response events occurring in a serverless computing environment, such as the receipt of hypertext transfer protocol requests.

Serverless functions and other types of software services ("services") are typically deployed in distributed computing environments based on definition files. Definition files specify adjustable settings for the services and may include resource specifications indicating resource allocations or resource requirements for the services. For example, a resource specification can indicate the memory, disk space, and processing requirements of a service.

DETAILED DESCRIPTION

Figure 1:
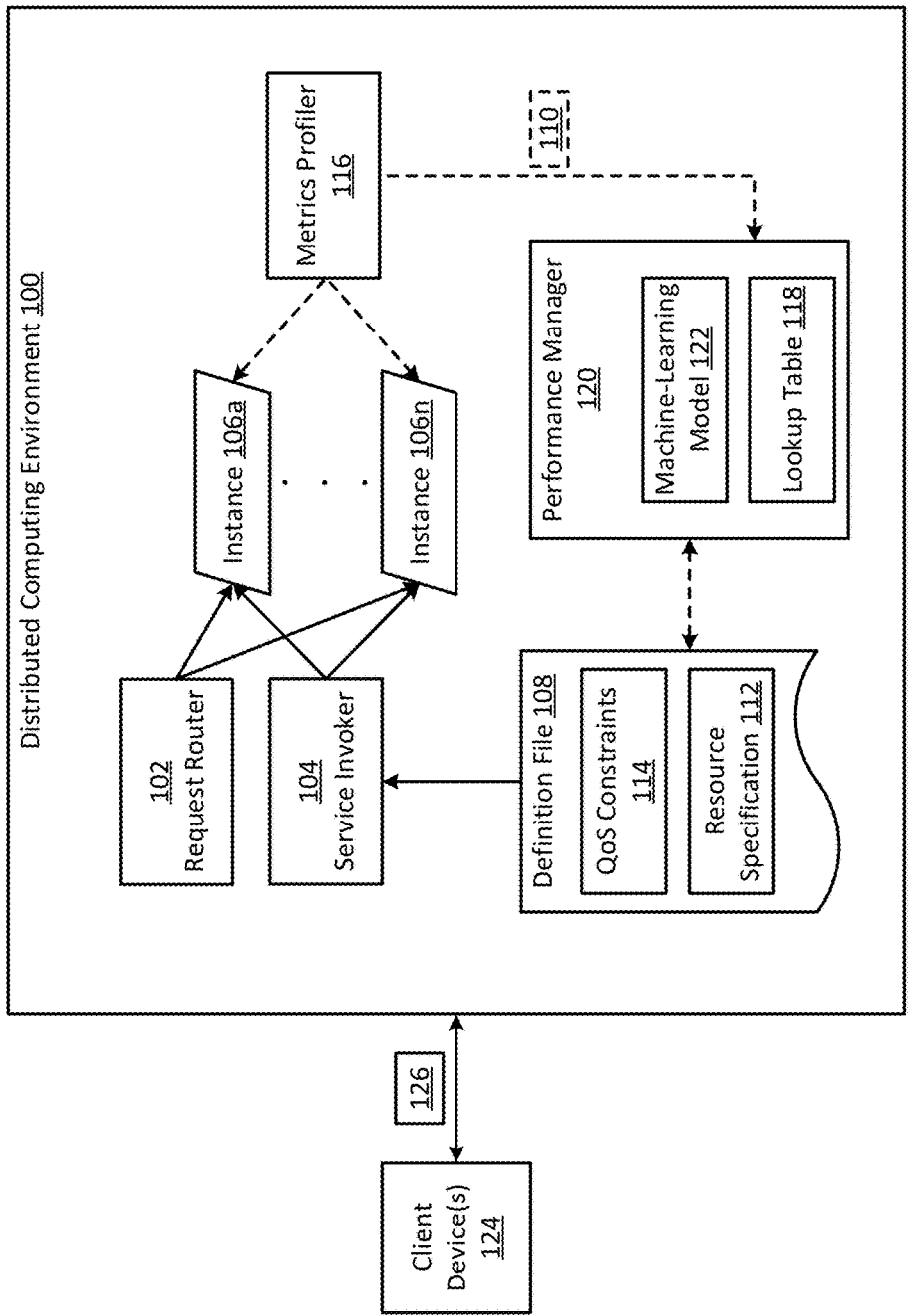
FIG. 1 is a block diagram of an example of a system for managing performance of software services according to some aspects of the present disclosure.

Distributed computing environments can execute serverless functions and other types of software services ("services") to perform various tasks. To execute such services, a distributed computing environment can allocate lower-level resources like memory, disk space, and processing time to the service. Distributed computing environment often monitor the consumption of these lower-level resources to ensure that they satisfy certain lower-level constraints, such as limits on the total amount of memory consumed in given timeframes. But distributed computing environments generally lack any mechanism to monitor higher-level parameters, such as quality-of-service (QoS) parameters. QoS parameters generally relate to higher-level dimensions like performance, availability, and reliability of services. And constraints on higher-level parameters are different than lower-level constraints, in that higher-level constraints are generally specific to a particular service and dependent on how the lower-level resources are allocated to the particular service. The inability of distributed computing environments to monitor and satisfy higher-level constraints can result in numerous problems, such as interoperability issues, high latency, and low responsiveness associated with services.

Some examples of the present disclosure can overcome one or more of the abovementioned problems via software that can automatically analyze the resource usage of an existing instance of a service in a distributed computing environment. As used herein, resource usage is the usage of lower-level resources such as memory usage, disk usage, processor usage, or network usage. Based on the resource usage, the software can then automatically modify a definition file used for deploying the service. The definition file can be modified based on a predefined QoS constraint. By modifying the definition file in this way, subsequent instances of the service deployed using the definition file may more closely satisfy the QoS constraint than the existing instance. This process can iterate over time, so that instances of the service are automatically and incrementally optimized to more closely satisfy the QoS constraint.

As one particular example, a system of the present disclosure can receive resource-usage information describing the resource usage of a first instance of a service in a distributed computing environment. The system can then determine a QoS constraint for the service, such as a latency constraint, a responsiveness constraint, an availability constraint, or a reliability constraint. The system may determine the QoS constraint by retrieving the QoS constraint from a definition file for the service, for example if a user has pre-specified the QoS constraint in the definition file. After determining the QoS constraint, the system can modify the definition file based on the resource-usage information and the QoS constraint.

At a later point in time, the system can deploy a second instance of the service in the distributed computing environment using the modified definition file. The system may also shut down the first instance of the service, before or after deploying the second instance. As a result of the modifications to the definition file, the second instance may more closely satisfy the QoS constraint than the first instance. In some examples, the above process can repeat over time so that later-deployed instances of the service get incrementally closer to satisfying the QoS constraint than earlier-deployed instances, though it may not always be the case that multiple iterations are needed to sufficiently satisfy the QoS constraint.

Some examples of the present disclosure may be particularly applicable in the context of edge computing. Edge computing has become increasingly popular for services that require high responsiveness and low latency. Edge computing solutions involve executing services on nodes (e.g., servers or virtual machines) positioned at physical edges of a distributed computing environment that are geographically close to corresponding client devices, to reduce latency and improve the perceived quality of the services. While executing services on edge nodes can improve the performance of the services to a degree, some examples of the present disclosure may further improve performance by iteratively tuning the services executing on the edge nodes over time to more closely match one or more QoS constraints. Alternatively, some examples of the present disclosure may improve the performance of services executing on non-edge nodes to such an extent that expensive edge-computing solutions may be avoided.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for managing performance of software services in a distributed computing environment 100 according to some aspects of the present disclosure. The distributed computing environment 100 can include any number and combination of nodes implementing some or all of the software functionality described herein. Some of the nodes may be edge nodes positioned geographically proximate to one or more client devices in communication with the distributed computing environment 100.

The distributed computing environment 100 can include a request router 102, which can be software for receiving electronic communications in the form of requests 126 and routing the requests 126 to their appropriate destinations within the distributed computing environment 100. The requests 126 can be received from client devices 124 or from a source internal to the distributed computing environment 100. For example, the request router 102 can receive hypertext transfer protocol (HTTP) requests from one or more client devices 124 and route the requests to the appropriate services executing in the distributed computing environment 100.

The distributed computing environment 100 can also include a service invoker 104, which can be software for deploying services in the distributed computing environment 100. In some examples, the distributed computing environment 100 can be event driven. One type of event can be the receipt of a request 126 for a service that is not currently executing in the distributed computing environment 100. The distributed computing environment 100 can detect such events and interface with the service invoker 104 for causing the service invoker 104 to automatically deploy one or more instances 106a-n of the appropriate services to handle the requests 126.

The service invoker 104 can deploy one or more instances 106a-n of a particular service based on a definition file 108 for the particular service. Each service can have its own definition file. The definition file 108 for a service can specify settings and customizations for the service. Among those settings and customizations can be a resource specification 112, which may indicate lower-level resource constraints or lower-level resource requirements for the service. For example, the resource specification 112 can indicate the memory, disk space, and processing requirements of the corresponding service. The service invoker 104 can ingest the definition file 108 and deploy one or more instances 106a-n of service in accordance with the resource specification 112, as well as the other settings and customizations in the definition file 108.

In some examples, the definition file 108 can also specify one or more higher-level constraints, such as QoS constraints 114. For example, the definition file 108 can specify a latency constraint, responsiveness constraint, reliability constraint, availability constraint, or any combination of these. Latency refers to the roundtrip time associated with responding to a request from a client device, from the time at which the request is initially sent from a client device to the service to the time at which and the service's response is received by the client device. An example of a latency constraint can be a maximum amount of latency allowable. Responsiveness refers to the amount of time it takes the service to react to a request once it has received one, and is responsible for a subpart of the total latency perceived by a client device. An example of a responsiveness constraint can be a maximum-allowable response time. Reliability refers to the probability that the service will produce the correct outputs up to some given time t. An example of a reliability constraint may be a minimum percentage of outputs that must be correct, such as 99%. Availability refers to the probability that the service will be operational at a given time. An example of an availability constraint may be a minimum-allowable uptime amount, such as 99.9%.

In some examples, the QoS constraints 114 can be provided as metadata in the definition file 108. This may enable the service invoker 104 to deploy the instances 106a-n of the service while ignoring the QoS constraints 114, such that the service invoker 104 is agnostic to the QoS constraints 114 contained in the definition file. For example, a user or system administrator of the distributed computing environment 100 may edit the definition file 108 and manually include the QoS constraints 114. Since typical service invokers 104 are not designed understand or implement QoS constraints, including the QoS constraints 114 as a regular part of the definition file 108 may cause the service invoker 104 to malfunction. So, the QoS constraints 114 may be included as metadata (e.g., annotations or comments) designed to be overlooked by the service invoker 104, thereby preventing the service invoker 104 from malfunctioning. Alternatively, the QoS constraints 114 can be stored elsewhere in the distributed computing environment 100, such as in a database.

The distributed computing environment 100 can also include a metrics profiler 116, which can be software for monitoring metrics relating to one or more instances 108a-n of one or more services deployed in the distributed computing environment 100. In some examples, the metrics can include the lower-level resource usage of the one or more services. For example, the metrics profiler 116 can determine the lower-level resource usage of the one or more services, such as memory usage, disk usage, processing usage, or network usage by the instances 106a-n. In one such example, the resource usage can be received from filesystem locations such as /proc and /sys for a Linux operating system. The resource usage can be obtained using standard interface features including I/O stat for disk and central-processing unit information, Top for central-processing unit and memory information, and SAR for network information. In some examples, the metrics can additionally or alternatively include higher-level metrics associated with the one or more services. For example, the metrics profiler 116 can monitor the latency, the response time, and/or other QoS parameters associated with the instances 106a-n. In one such example, the metrics profiler 116 can monitor a higher-level metric such as end-to-end latency by interacting with other components of the distributed computing environment 100 (e.g., the request router 102) and/or the client device(s) 124. The metrics profiler 116 can then generate metrics information 110 including the metrics associated with the instances 106a-n and transmit the metrics information 110 to a performance manager 120.

The performance manager 120 can be software for receiving the metrics information 110 from the metrics profiler 116 and managing the higher-level performance characteristics of the instances 106a-n. The performance manager 120 can manage the higher-level performance characteristics of the instances 106a-n based on the received metrics information 110. For example, the performance manager 120 can retrieve the QoS constraints 114 for a service from the definition file 108 or from another source, like a database. The performance manager 120 can then determine if an instance 106a of the service sufficiently satisfies the QoS constraints 114 based on the metrics information 110. If not, the performance manager 120 can determine one or more adjustments to the definition file 108 configured to cause a subsequent instance 106n of the service to more closely satisfy the QoS constraint than instance 106a. Examples of such adjustments can include modifying a CPU allocation, a memory allocation, a NUMA CPU pinning, a Hugepage allocation, a GPU or other accelerator allocation, a replica allocation, an idle time, or any combination of these. The performance manager 120 can then apply the adjustments to the definition file 108, for example by overwriting at least some of the resource specification 112 in the definition file 108 with the adjustments. By modifying the definition file 108 in this way to improve the performance of subsequent instances of the service, existing software components such as the service invoker 104 can remain more generalized and need not be reprogrammed to implement some aspects of the present disclosure.

In one particular example, the performance manager 120 can determine a QoS constraint 114 involving a maximum-allowable response time for a service associated with definition file 108. The performance manager 120 can then determine an adjustment to the definition file 108 based on the metrics associated with an instance 106a of the service. The adjustment can involve modifying one or more aspects of the resource specification 112, such as memory and processor allocations, that can influence response time. The performance manager 120 can then apply the adjustment(s) to the definition file 108. This can cause a subsequent instance 106n of the service to be deployed by the service invoker 104 in accordance with the updated version of the resource specification 112, which in turn can cause the subsequent instance 106n to more closely satisfy the constraint on maximum-allowable response time. In some examples, the previous instance 106a may then be shutdown by the distributed computing environment 100, and the request router 102 can route subsequent requests 126 (e.g., from the client devices 124) associated with the service to the other instance 106n.

In some examples, the performance manager 120 can determine which portions of the definition file 108 to adjust based on a predefined lookup table 118. The lookup table 118 can include relationships between adjustable settings in the definition file 108 and higher-level performance characteristics, such as relationships between lower-level resource allocations and higher-level QoS characteristics. For example, the lookup table 118 can include relationships between network resources and latency. As another example, the lookup table 118 can include relationships between memory, processing power, and responsiveness. As yet another example, the lookup table 118 can include a relationship between a quantity of replicas (e.g., copies) of the service and availability. The performance manager 120 can access the lookup table to determine which adjustable settings of the definition file 108 influence a higher-level performance characteristic, and then determine how to adjust (e.g., increase or decrease) those adjustable settings to satisfy a constraint on the higher-level performance characteristic. For example, the performance manager 120 can determine that the current response-time of an instance 106a does not satisfy a response-time constraint, access the lookup table 118 to determine that memory allocation influences a service's response-time, and then determine that an increase to the memory allocation to assist with satisfying the response-time constraint. The performance manager 120 can then apply the adjustment to a portion of the definition file 108, such as the resource specification 112, for configuring the memory allocation of the service.

In some examples, the performance manager 120 can determine how much to adjust the adjustable settings in the definition file 108 based on a default value or a random value. For example, the performance manager 120 can simply apply a default percentage increase (e.g., 5%) to an adjustable setting, such as an existing memory or processor allocation in the definition file 108. In another example, the performance manager 120 can apply a random percentage increase to an adjustable setting in the definition file 108. Either way, instances will gradually get closer and closer to satisfying the higher-level constraint over time.

Additionally or alternatively, the performance manager 120 can apply a smarter approach to determining how to adjust the adjustable settings in the definition file 108. For example, the performance manager 120 can collect both lower-level resource usage metrics and higher-level parameter metrics associated with the one or more instances 106a-n over time, so that the performance manager 120 can use this historical information to learn correlations between the two. The performance manager 120 may learn these correlations by applying one or more algorithms to the lower-level metrics and the higher-level metrics, such as by performing a regression analysis on this information or training a machine-learning model 122 based on this information. In this way, the performance manager 120 can identify relationships between the lower-level and higher-level metrics, so that the performance manager 120 can determine how changes to lower-level resource usage may influence the higher-level parameters.

In some examples, the performance manager 120 can supply some or all of the metrics information 110 and one or more higher-level constraints as input to the trained machine-learning model 122. The trained machine-learning model 122 can provide an output indicating which, and how much, lower-level resources should be adjusted to more closely satisfy the one or more higher-level constraints. Examples of the machine-learning model 122 can be a neural network or classifier. As noted above, the machine-learning model 122 may be trained using a training dataset that includes historical information collected over a prior timespan, such as lower-level resource usage and higher-level parameter information associated with one or more services. Once trained, the performance manager 120 can use the machine-learning model 122 to determine which aspects of the definition file 108 to tune, and/or how to tune those aspects, to satisfy one or more higher-level constraints such as the QoS constraints 114. The performance manager 120 can then apply these adjustments to the definition file 108, to cause subsequently deployed instances of the service to more closely satisfy the higher-level constraints.

In some examples, the performance manager 120 can change the number of replicas of a service to more closely satisfy the higher-level constraints. For example, the definition file 108 for a service can include a replica-quantity value. The performance manager 120 can increase the replica-quantity value to cause subsequently deployed instances of the service to have more replicas, or the performance manager 120 can decrease the replica-quantity value to cause subsequently deployed instances of the service to have fewer replicas. Alternatively, the performance manager 120 can interact with the distributed computing environment 100, such as through an API of the distributed computing environment 100, to adjust the number of replicas of the service. The performance manager 120 may determine how to adjust the number of replicas using a lookup table 118, a trained machine-learning model 122, or both.

In some examples, the machine-learning model 122 can be updated over time. The machine-learning model 122 can be updated based on feedback about how a subsequent instance 106n of a service performs, after a suggested modification output by the machine-learning model 122 is applied to definition file 108 for the service. For example, the metrics profiler 116 can provide metrics information 110 about the subsequent instance as feedback to the performance manager 120, which can further train the machine-learning model 122 based on the suggested modification and the feedback, so that the accuracy of the machine-learning model 122 can improve over time.

While FIG. 1 depicts a certain number and configuration of software components for illustrative purposes, other examples can include more components, fewer components, different components, or a different arrangement of the components shown in FIG. 1. For instance, in an alternative example the metrics profiler 116 can be combined with the performance manager 120 in a single piece of software. And although certain examples are described herein with respect to QoS constraints 114, it will be appreciate that the principles described herein may also be applied to other types of higher-level constraints as well.

Figure 2:
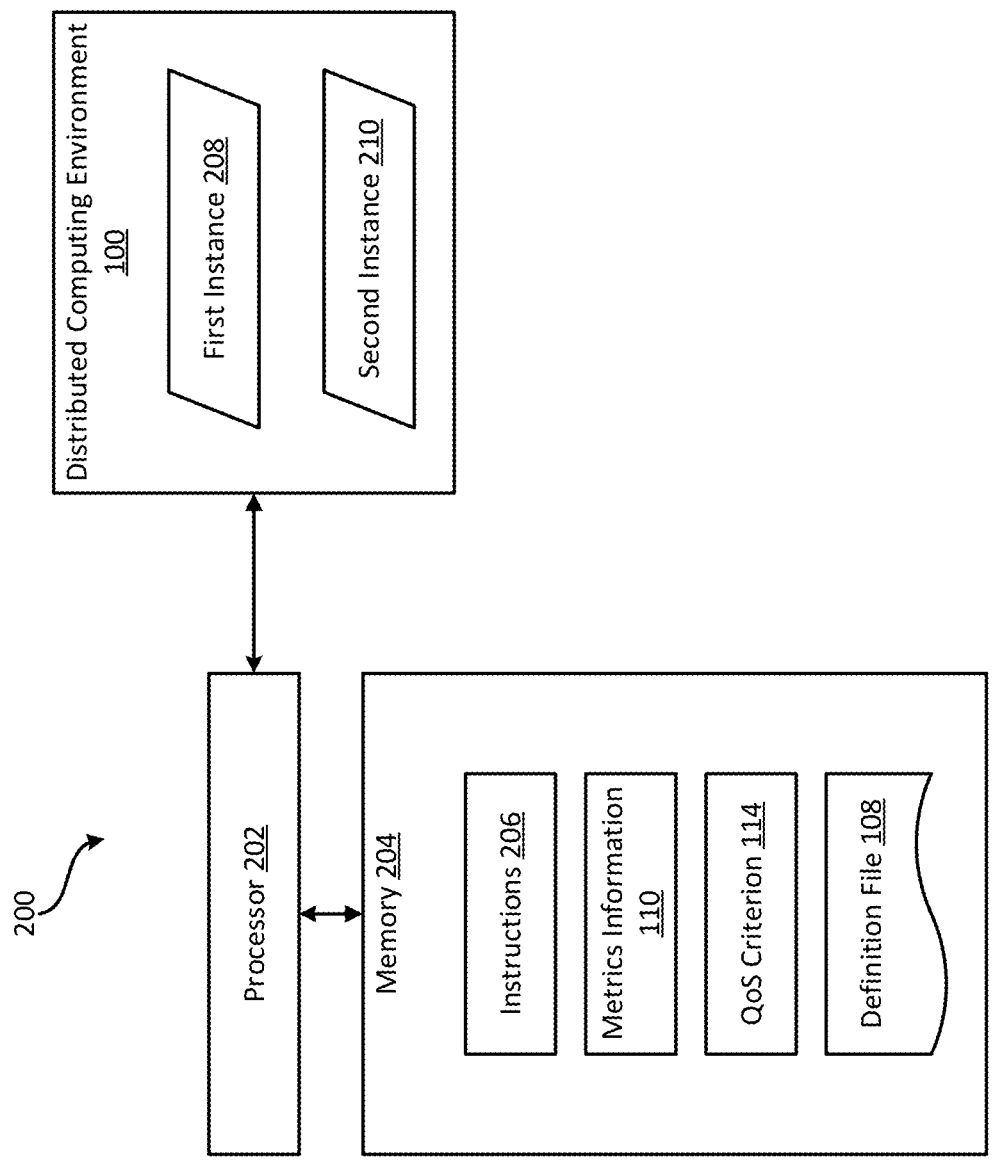
FIG. 2 is a block diagram of another example of a system for managing performance of software services according to some aspects of the present disclosure.

FIG. 2 is a block diagram of another example of a system 200 for managing performance of software services according to some aspects of the present disclosure. The system 200 includes a processor 202 communicatively coupled with a memory 204. In some examples, the processor 202 and the memory 204 can be parts of one or more nodes in the distributed computing environment 100.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can receive metrics information 110 for a first instance 208 of a service in a distributed computing environment 100. The processor 202 can then determine a quality-of-service (QoS) constraint 114 for the service. The processor 202 can modify a definition file 108 based on the metrics information 110 and the QoS constraint 114. The definition file 108 can be configured for deploying instances of the service in the distributed computing environment 100. After modifying the definition file 108, the processor 202 can deploy a second instance 210 of the service in the distributed computing environment 100 using the modified definition file. The second instance 210 can be configured to more closely satisfy the QoS constraint 114 than the first instance 208.

Figure 3:
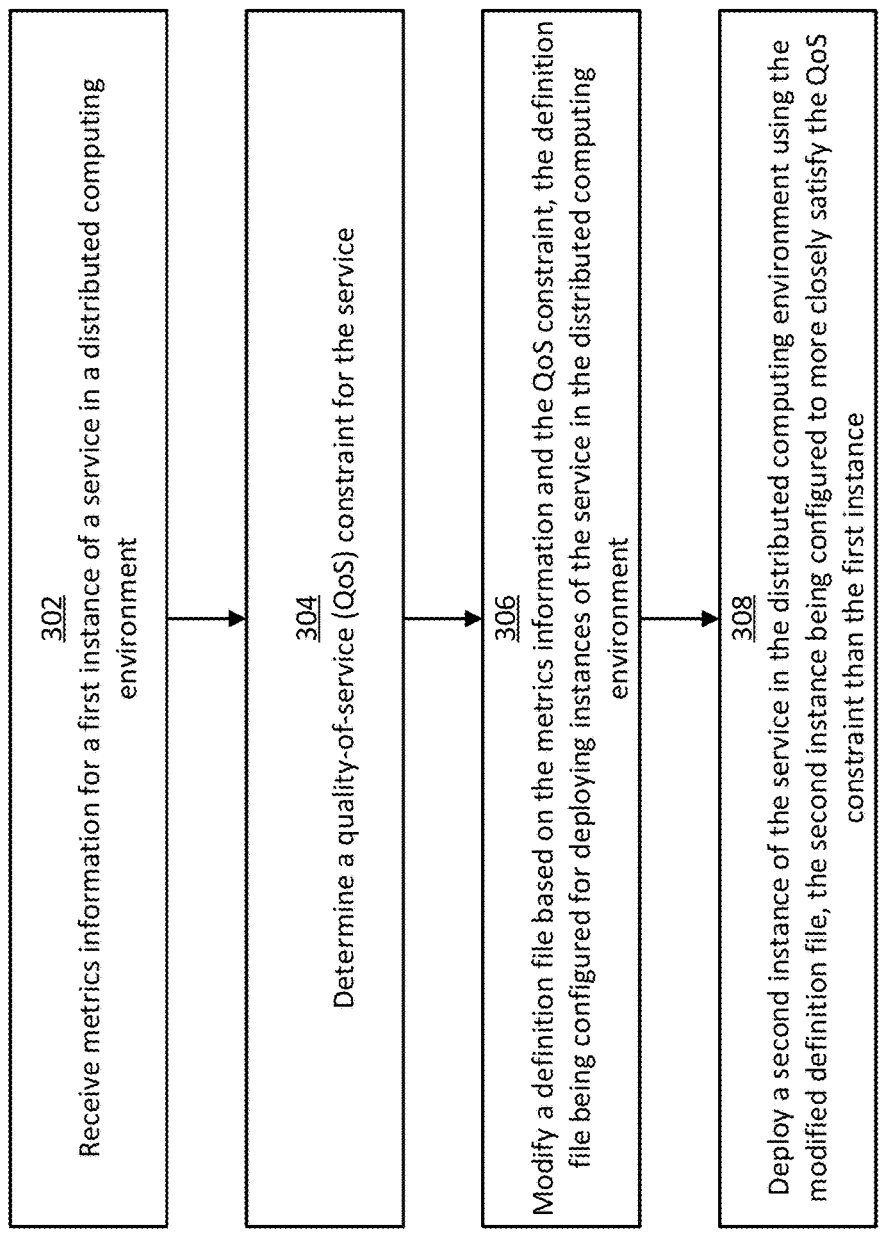
FIG. 3 a flow chart of an example of a process for managing performance of software services according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, a processor 202 receives metrics information 110 for a first instance 208 of a service in a distributed computing environment 100. The processor 202 can receive the metrics information 110 from a metrics profiler (e.g., metrics profiler 116 of FIG. 1) in some examples. The metrics information 110 can include lower-level metrics (e.g., resource-usage metrics) for the first instance 108, higher-level metrics (e.g., QoS metrics) for the first instance 108, or both.

In block 304, the processor 202 determines a quality-of-service (QoS) constraint 114 for the service. The processor 202 can determine the QoS constraint 114 by extracting the QoS constraint 114 from a definition file 108, obtaining the QoS constraint 114 from a database, or receiving the QoS constraint 114 from another source.

In block 306, the processor 202 modifies a definition file 108 based on the metrics information 110 and the QoS constraint 114. The definition file 108 is configured for deploying instances of the service in the distributed computing environment 100. For example, the processor 202 can modify one or more adjustable settings in the definition file 108, such as one or more lower-level resource allocations in a resource specification of the definition file 108, based on one or both of the metrics information 110 and the QoS constraint 114. In some examples, modifying the definition file 108 can include adjusting a value in the definition file 108 to change the number of replicas of the service. For example, a replica-quantity value can be increased or decreased. This may cause the higher-level constraints to be more closely satisfied.

In block 308, the processor 202 deploys a second instance 210 of the service in the distributed computing environment 100 using the modified definition file. The processor 202 may or may not deploy the second instance 210 in response to a request from a client device. Deploying the second instance 210 may involve the processor 202 issuing one or more commands, such as one or more application programming interface (API) calls, to the distributed computing environment 100 for causing the second instance 210 to be deployed. The second instance 210 can be configured to more closely satisfy the QoS constraint 114 than the first instance 208.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
one or more processors; and
one or more memories including instructions that are executable by the one or more processors for causing the one or more processors to:
deploy an instance of a service in a distributed computing environment using a definition file configured for deploying instances of the service;
receive metrics information describing resource usage by the service in the distributed computing environment;
determine a quality-of-service (QoS) constraint for the service by obtaining the QoS constraint from the definition file; and
subsequent to receiving the metrics information and determining the QoS constraint, automatically modify the definition file based on the metrics information and the QoS constraint.

2. The system of claim 1, wherein the metrics information includes resource-usage metrics indicating memory usage, disk usage, processor usage, or network usage associated with the service.

3. The system of claim 1, wherein the metrics information includes QoS metrics indicating a latency, a responsiveness, an availability, or a reliability of the service.

4. The system of claim 1, wherein the QoS constraint is predefined in the definition file by a user.

5. The system of claim 1, wherein the one or more memories further include instructions that are executable by the one or more processors for causing the one or more processors to:
provide the metrics information and the QoS constraint as input to a trained machine-learning model for receiving tuning information as output from the trained machine-learning model, the tuning information indicating an adjustment to a portion of the definition file for the service; and
modify the portion of the definition file based on the tuning information.

6. The system of claim 5, wherein the portion of the definition file is a resource specification indicating how computing resources are to be allocated to the service.

7. The system of claim 1, wherein the one or more memories further include instructions that are executable by the one or more processors for causing the one or more processors to iteratively perform a tuning process associated with the service, wherein each iteration of the tuning process involves:
receiving respective metrics information corresponding to the service; and
modifying one or more aspects of the definition file based on the respective metrics information and the QoS constraint.

8. The system of claim 1, wherein the one or more memories further include instructions that are executable by the one or more processors for causing the one or more processors to:
deploy the service at a physical edge of the distributed computing environment, and wherein the service includes a serverless function.

9. A method comprising:
deploying, by one or more processors, an instance of a service in a distributed computing environment using a definition file configured for deploying instances of the service;
receiving, by the one or more processors, metrics information at a first time, the metrics information describing resource usage by the service in the distributed computing environment;
determining, by the one or more processors, a quality-of-service (QoS) constraint for the service; and
subsequent to receiving the metrics information and determining the QoS constraint:
determining, by the one or more processors, a modification to apply to the definition file, wherein the modification is determined based on the metrics information and the QoS constraint, and wherein the modification is configured to cause one or more instances of the service to more closely satisfy the QoS constraint at a subsequent time after the first time; and
automatically applying, by the one or more processors, the modification to the definition file.

10. The method of claim 9, wherein the metrics information includes resource-usage metrics indicating memory usage, disk usage, processor usage, or network usage associated with the service.

11. The method of claim 9, wherein the metrics information includes QoS metrics indicating a latency, a responsiveness, an availability, or a reliability of the service.

12. The method of claim 9, further comprising determining the QoS constraint by obtaining the QoS constraint from the definition file.

13. The method of claim 12, wherein the QoS constraint is predefined in the definition file by a user.

14. The method of claim 9, further comprising:
providing the metrics information and the QoS constraint as input to a trained machine-learning model for receiving tuning information as output from the trained machine-learning model, the tuning information indicating an adjustment to a portion of the definition file for the service; and
modifying the portion of the definition file based on the tuning information.

15. The method of claim 14, wherein the portion of the definition file is a resource specification indicating how computing resources are to be allocated to the service.

16. The method of claim 9, further comprising iteratively performing a tuning process, wherein each iteration of the tuning process involves:
 receiving respective metrics information corresponding to the service; and
 modifying one or more aspects of the definition file based on the respective metrics information and the QoS constraint.

17. The method of claim 9, further comprising deploying the service at a physical edge of the distributed computing environment, and wherein the service includes a serverless function.

18. A non-transitory computer-readable medium comprising program code that is executable by one or more processors for causing the one or more processors to:
 deploy an instance of a service in a distributed computing environment using a definition file configured for deploying instances of the service;
 receive metrics information at a first time, the metrics information describing resource usage by the service in the distributed computing environment;
 determine a quality-of-service (QoS) constraint for the service; and
 subsequent to receiving the metrics information and determining the QoS constraint:
  determine a modification to apply to the definition file, wherein the modification is determined based on the metrics information and the QoS constraint, and wherein the modification is configured to cause one or more instances of the service to more closely satisfy the QoS constraint at a second time after the first time; and
  automatically apply the modification to the definition file.

19. The non-transitory computer-readable medium of claim 18, further comprising program code that is executable by the one or more processors for causing the one or more processors to:
 determine the QoS constraint by obtaining the QoS constraint from the definition file.

20. The non-transitory computer-readable medium of claim 18, further comprising program code that is executable by the one or more processors for causing the one or more processors to iteratively perform a tuning process associated with the service, wherein each iteration of the tuning process involves:
 receiving respective metrics information corresponding to the service; and
 applying a respective modification to one or more aspects of the definition file, the respective modification being determined based on the respective metrics information and the QoS constraint, wherein the respective modification is configured to cause the service to more closely satisfy the QoS constraint in a subsequent iteration of the tuning process than in a current iteration of the tuning process.

* * * * *